M. SWENSON.
CALCULATOR.
APPLICATION FILED FEB. 8, 1918.
1,336,990.
Patented Apr. 13, 1920.
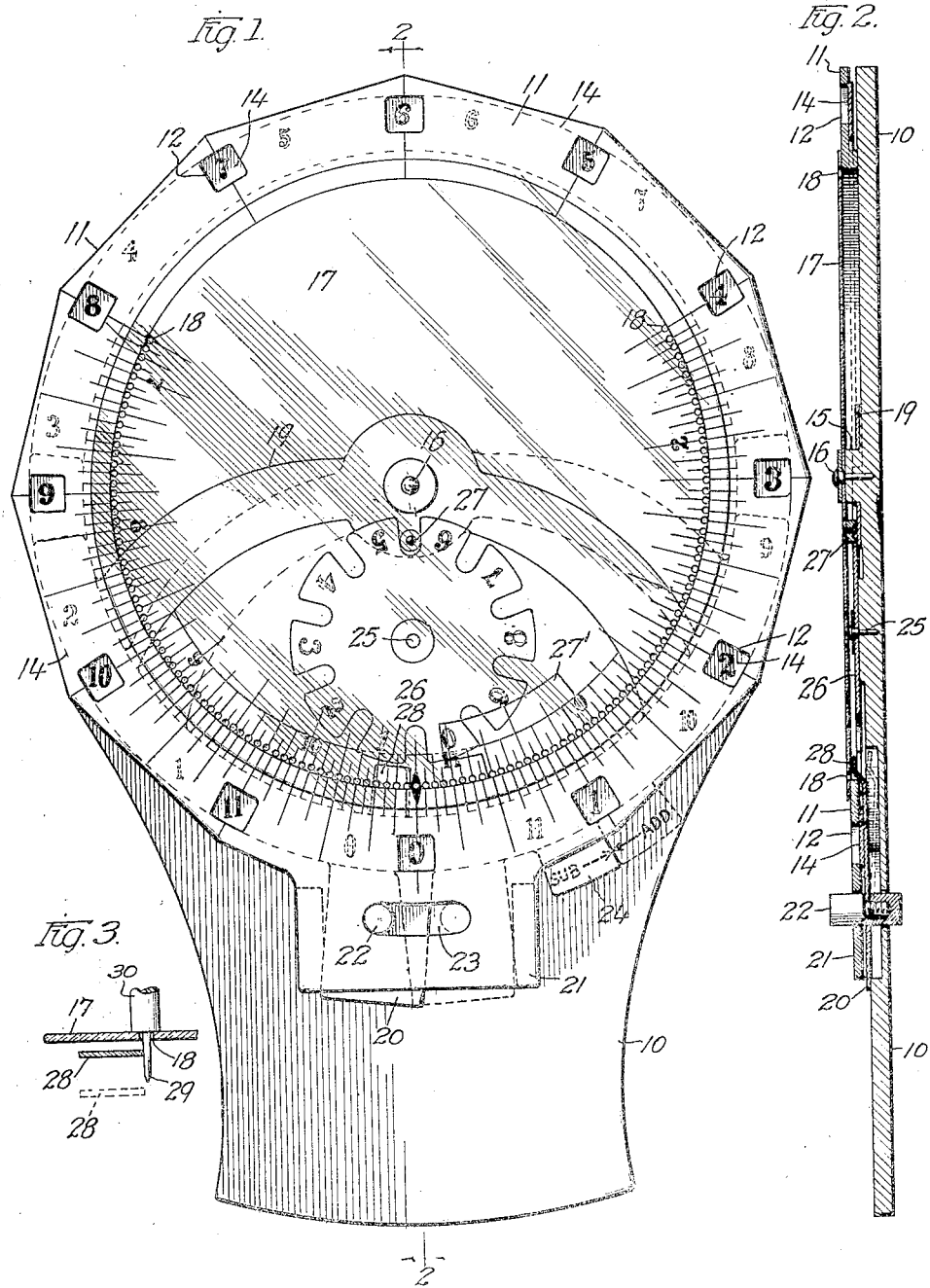

UNITED STATES PATENT OFFICE.

MARTIN SWENSON, OF CHICAGO, ILLINOIS.

CALCULATOR.

1,336,990. Specification of Letters Patent. Patented Apr. 13, 1920.

Application filed February 8, 1918. Serial No. 215,950.

*To all whom it may concern:*

Be it known that I, MARTIN SWENSON, a citizen of the United States of America, and a resident of Chicago, county of Cook, and State of Illinois, have invented certain new and useful Improvements in Calculators, of which the following is a specification.

My invention relates to calculators and has for its object the construction of a simple and convenient device for adding and subtracting numbers. In the accompanying drawings I have illustrated my invention graduated for the addition and subtraction of inches and fractions of an inch up to ten feet or more. In said drawings—

Figure 1 is a plan;

Fig. 2 is a section on line 2—2 of Fig. 1; and

Fig. 3 is an enlarged detail.

On a base 10 is secured a ring 11 having therein a series of equally spaced openings 12. Or the ring may be a part of the base itself. Between the base 10 and the ring 11 is an annular space within which is a ring
14. The ring 14 has on it two sets of numbers. One set of numbers is shown in full lines through the openings 12, and they are arranged contraclockwise from "0" around on the ring 14. The other set of numbers is shown in dotted lines and they are arranged in the opposite direction around the circle of the ring 14, that is, in clockwise order.

For use in adding and subtracting inches and fractions of an inch, there are twelve openings 12 in the ring 11, and the ring 14 has two sets of twelve numbers arranged as described. The "0" point is at the lowest opening 12, and the distance from the center of that opening to the center of the next adjacent opening is taken as representing one inch. This "inch" is graduated on the upper surface or face of the ring 11, in the same way that an inch is graduated on an ordinary scale, and the graduations thus made are continued all of the way around. In the drawing part of these graduations are omitted for simplification.

On the base 10 at the center of the ring 11 is a boss 15, and in the center of this boss is a pin 16. Pivoted on the pin 16 is a celluloid or other transparent dial 17. This dial overlaps the ring 11 and is graduated to match that ring. These graduations are radial on both ring and dial with the result that when the two sets of graduations match at one point they match all of the way around. When so matched the two sets of graduations look as if they were only one set. The graduations on the dial 17 are numbered in the same way that inches are numbered on an ordinary scale, and these numbers are shown in small size on the face of the dial in Fig. 1.

Extending through the dial 17 at all points of graduation, are small holes 18 adapted for the insertion of a stylus 30 for turning the dial on its pivot. These holes are closely adjacent to the inner edge of the ring 11.

Pivoted on the boss 15 is a piece 19 which appears in Fig. 1 in the form of two arms which extend laterally to points under ring 14. From these points the piece or part 19 follows the ring 14 downward to the center and terminates in a projection 20 which lies under a projection 21 on the ring 11. The parts 19 and 20 are in fact one piece pivoted on the boss 15.

The part 19 is secured to the ring 14 by cementing or riveting at the points where the laterally extending arms first come to that ring, but it is otherwise free from that ring. The part 19 is made of flexible material so that those portions of it which lie under the ring 14 between the points of connection may be pushed downward away from the ring as will be described.

On the projection 20 is a button or short handle 22 which projects through a slot 23 in the projection 21. Because the projection 20 is part of the piece 19, and because the piece 19 is secured to the ring 14, moving the button 22 in the slot 23 serves to move the ring 14 in the annular space between the base 10 and the ring 11. The length of the slot 23 is such that when the button 22 is at one end of it, one set of the figures on ring 14 will appear under openings 12, and when the button is pushed to the other end of the slot, the other set of figures will appear at these openings.

The ring 14 has on it a projection 24 which projects outward through a suitable opening to a point outside of the ring 11 and over a part of the base 10. Marked on the base at this place are the legends "Add" and "Sub" with suitable arrows. These legends are so located that one is covered by the projection 24 and the other is uncovered when the button 22 is at one end of its slot. When the button is moved to the other end of the slot, then the covered and uncovered legends are reversed.

Secured to the base 10 is a pin 25 upon which is pivoted a wheel 26 having ten notches therein and numbers on the spaces between these notches. Secured on the under face of the dial 17 is a pin 27 arranged to engage a notch in the wheel 26 and move it the distance of one space each time the dial 17 makes a complete revolution on its pivot 16. In other words, the dial 17 and wheel 26 are geared together in the ratio of ten to one. The wheel 26 is also made of transparent material.

On the base 10 at a convenient point is a space 27' which is painted white on a background which is otherwise dark. Or this white space may be formed by pasting a white piece of paper on the base 10. The object of this white space is to make a background upon which it is easy to read the numbers on the dial 17 and on the wheel 26. The right hand margin of this white space is made radial to the center 16 and in line with one of the graduations on the ring 11. Hence, when the graduations on dial 17 match those on ring 11, one of the graduations on dial 17 will match the right hand edge of this white space. The left hand margin of the white space is arranged so that it will furnish a background for one of the numbers on the wheel 26, the other numbers being over a dark background.

Assume the dial 17 to be set so that the "0" graduation thereon matches the right hand margin of the white space 27, and that the "0" on the wheel 26 be over the left hand margin of the white space. This is the position shown in Fig. 1 and is the zero position of the apparatus. In this position one of the holes 18 in the dial 17 matches the graduation which passes through the "0" showing through the lower opening 12. This particular hole is indicated by a black spot and is so marked on the apparatus for identification purposes. It will here be called the "setting hole." On the part 19, and extending upward opposite the projection 20, is a small projection 28. This projection lies close to the under face of the dial 17 near the holes 18. It lies in the path of the point 29 of the stylus 30. This projection 28 is, in fact, a stop for the stylus in setting and operating the device. When the button 22 is at the left end of the slot 23 as shown in the drawing, the right hand edge of the projection 28 lies adjacent to the graduation which passes through the "0" showing in the lower opening 12. If, when the button 22 is in the position shown, the stylus be inserted in the setting hole and the dial be moved in a clockwise direction until stopped by the stylus engaging projection 28, then the dial will be in its zero position. If the button 22 be moved to the right hand end of slot 23, and the stylus in the setting hole be moved in a contra-clockwise direction, then it will be stopped again with the dial in its zero position. Thus the width of the projection 28 is the length of its lateral movement less the diameter of the point 29 on stylus 30.

As shown in Fig. 2, the lower end of the projection 20 rests on the base 10, but just above this point of contact the base 10 is cut away. As previously stated the part 19—20 is of flexible material and is connected to the ring 14 only at points near the outer ends of those laterally projecting arms which constitute the upper part of the piece 19. Consequently, by pressing inward on the button 22 the projection 28 may be moved from the full line position to the dotted line position shown in Figs. 2 and 3. When so moved the stylus can pass over the projection 28 and not be stopped thereby.

To operate the device the parts are set with all parts at zero position as has been described, and as they are shown in Fig. 1. This leaves the legend "Add" with its arrow uncovered. The exposed "Add" means that the device is set for addition, and that the direction in which the stylus is moved is that indicated by the exposed arrow. The first of the numbers to be added is then read on the scale on ring 11 and the stylus is inserted in that hole 18 which matches the graduation indicating this number. The stylus is then moved in a clockwise direction to stop against the projection 28. The second number to be added is similarly read on the scale on ring 11, the stylus is inserted in the hole matching the corresponding graduation, and the stylus is again moved to a stop. The third, fourth and any number of other numbers are added in the same way. The sum of the additions is read on that part of the dial which matches the right hand edge of the white space 27.

Let us assume that the first of the numbers to be thus added was two and three-eighths inches. This number would be read on the scale of ring 11 and be found a little above the "2" showing through one of the holes 12. The distance would be read from the "0" at the bottom, and if the stylus be inserted in that hole 18 which matches that graduation and be moved in a clockwise direction back to that "0" point, then the dial would be moved through the distance read. But before the movement began, the "0" of the dial was matched on the right hand edge of the white spot 27, and consequently at the end of the movement that graduation would be over this point which represented the amount of the movement.

If the sum of the additions should be more than twelve inches, then the dial would be moved more than one complete revolution, and the wheel 26 would be moved to bring "1" instead of "0" over the left hand part of spot 27. If the sum of the addition should be more than twenty-four inches then "2" of wheel 26 would be over the spot 27 and would indicate two feet and some inches. And so on. If the number to be added was such a thing as one foot and three inches, then the stylus would be inserted in the proper hole to aid three inches and the button 22 would be temporarily pressed so that the stylus might pass the projection 28 once and the dial be given a movement equal to one revolution and three inches.

If it is desired to get the difference between two numbers, then the larger of the two would be first set up by moving the dial in the manner described for adding. When this was done, the button 22 would be pushed to the other end of slot 23 to expose through openings 12 those marks on ring 14 which are now shown in dotted lines. The number to be subtracted would then be read to the left on ring 11 from "0" point, the stylus would be inserted in the hole 18 which matched this graduation, and the stylus would then be moved in the direction of the then exposed arrow (contra-clockwise direction) to stop against projection 28.

What I claim is:—

1. In a calculator, a base, a graduated ring mounted thereon and having openings in line with the principal graduations, a second ring located between the base and the first mentioned ring, said second ring being adjustable to either of two positions and having numbers thereon arranged to be displayed through said openings in the manner described, a dial mounted to turn upon a pivot located at the common center of said rings, said dial being provided with perforations corresponding to said graduations and said perforations being adapted to receive a stylus for turning the dial on its pivot, and a stop for said stylus, said stop being secured to and movable with said adjustable ring.

2. In a calculator, a base furnishing a graduated ring with openings in line with the main graduations, an adjustable ring pivoted at the center around which the graduations are arranged and movable to either of two fixed positions, said adjustable ring having two sets of numbers thereon one of which is displayed through said openings when the ring is in one position and the other of which is displayed when the ring is in the other position, a dial pivoted to turn on the common center and having graduations corresponding to the previously mentioned graduations, means by which said dial may be moved about its center to add or subtract numbers indicated by the graduations, and a stopping means secured to and adjustable with said adjustable ring.

3. In a calculator, the combination with stationary graduations, and movable graduations, said graduations being usable for addition and subtraction, of a stop adjustable to one position for addition and to another position for subtraction, two series of numbers associated with one set of said graduations, said series being reversely arranged for indicating either addition or subtraction, and connections between said stop and said numbers so that an adjustment of one brings about a corresponding adjustment of the other.

4. In a calculator, a ring provided with a series of openings, a second ring having thereon two sets of numbers, said second ring being adjustable to either of two positions so as to exhibit either set of numbers through the openings of the first ring, a rotatable dial provided with openings for the reception of a stylus, and a stop for said stylus, said stop being secured to and movable with said adjustable ring.

5. In a calculator, a ring of fixed graduations by which operations are indicated, a corresponding ring of movable graduations on which the sum of operations is read, movements in one direction serving to add numbers and movements in the opposite direction serving to subtract numbers, and an adjustable device serving to indicate either addition or subtraction and to control such addition or subtraction.

MARTIN SWENSON.